United States Patent
Laskawiec

(10) Patent No.: US 11,403,199 B2
(45) Date of Patent: Aug. 2, 2022

(54) SECURE DETECTION AND CORRECTION OF INEFFICIENT APPLICATION CONFIGURATIONS

(71) Applicant: Red Hat, Inc., Raleigh, NC (US)

(72) Inventor: Sebastian Laskawiec, Lipniki (PL)

(73) Assignee: RED HAT, INC., Raleigh, NC (US)

(*) Notice: Subject to any disclaimer, the term of this patent is extended or adjusted under 35 U.S.C. 154(b) by 396 days.

(21) Appl. No.: 16/773,565

(22) Filed: Jan. 27, 2020

(65) Prior Publication Data

US 2021/0232473 A1 Jul. 29, 2021

(51) Int. Cl.
| | |
|---|---|
| *G06F 11/00* | (2006.01) |
| *G06F 11/30* | (2006.01) |
| *G06F 11/36* | (2006.01) |
| *G06K 9/62* | (2022.01) |
| *G06F 9/50* | (2006.01) |
| *G06F 9/445* | (2018.01) |

(52) U.S. Cl.
CPC ...... *G06F 11/3051* (2013.01); *G06F 9/44505* (2013.01); *G06F 9/5011* (2013.01); *G06F 11/3006* (2013.01); *G06F 11/3688* (2013.01); *G06F 11/3692* (2013.01); *G06K 9/6256* (2013.01); *G06K 9/6267* (2013.01)

(58) Field of Classification Search
CPC ............. G06F 11/3006; G06F 11/3051; G06F 11/3688; G06F 11/3692
See application file for complete search history.

(56) References Cited

U.S. PATENT DOCUMENTS

| | | | |
|---|---|---|---|
| 10,382,260 B1 | 8/2019 | Narang et al. | |
| 10,417,043 B1 | 9/2019 | Braverman et al. | |
| 10,719,301 B1* | 7/2020 | Dasgupta | G06F 11/3688 |
| 2018/0052762 A1* | 2/2018 | Vyas | G06F 11/3668 |
| 2018/0349168 A1 | 12/2018 | Ahmed | |

(Continued)

FOREIGN PATENT DOCUMENTS

CN 105933448 9/2018

OTHER PUBLICATIONS

Kubernetes for Machine Learning, Deep Learning and AI; Charrington; 2018 (35 pages).

(Continued)

*Primary Examiner* — Joshua P Lottich
(74) *Attorney, Agent, or Firm* — K&L Gates LLP

(57) ABSTRACT

Methods and systems for detecting and correcting inefficient application configurations are presented. In one embodiment, a method is provided that includes receiving an application and executing the application multiple times according to different configurations. While executing the application, execution metrics may be measured associated with the different configurations. A classifier model may be trained based on the execution metrics and the different configurations. In particular, the classifier model may be trained to identify preferred configurations of the application. The classifier model may be provided to a second computing environment and may be used to identify inefficient configurations for subsequent deployments of the application within the second computing environment. The inefficient configurations may be identified without transmitting configurations or applications from the second computing environment.

20 Claims, 7 Drawing Sheets

(56) References Cited

U.S. PATENT DOCUMENTS

2019/0235906 A1    8/2019  Asawa et al.
2020/0319877 A1*  10/2020  Glazer ................ G06F 11/3051
2021/0208932 A1*   7/2021  Park ................... G06F 11/3495

OTHER PUBLICATIONS

Case Study: Launching and Scaling Up Experiments, Made Simple; https://kubernetesio/cae/studies/openai/; retrieved Sep. 27, 2019; (6 pages).
Primer: Kubeflow Streamlines Machine Learning with Kubernetes; Omier; Mar. 11, 2019; (10 pages).

* cited by examiner

SECURE DETECTION AND CORRECTION OF INEFFICIENT APPLICATION CONFIGURATIONS

BACKGROUND

Applications may execute in computing environments, such as distributed computing environments. Applications that execute in such computing environments may support multiple configurations that adjust the operation of the applications based on one or more factors. Certain configurations may operate better under certain types of conditions, while other configurations may operate better under different types of conditions.

SUMMARY

The present disclosure presents new and innovative systems and methods for detecting and correcting inefficient application configurations. In one embodiment, a method is provided that includes receiving an application for execution in a first computing environment. The application may be executed a plurality of times according to a plurality of configurations and a plurality of execution metrics may be measured that are associated with the plurality of configurations. A classifier model may be trained to identify one or more preferred configurations for the application based on the plurality of execution metrics and the plurality of configurations. The classifier model may be provided to a second computing environment. The classifier model may then be used to detect inefficient configurations for subsequent deployments of the application within the second computing environment. In particular, the classifier model may detect inefficient configurations of the application without transmitting configurations or the application from the second computing environment.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

In certain instances, users may execute applications on computing environments (e.g., cloud computing environments) provided and configured by another entity (e.g., a cloud computing provider). For example, users may execute applications in a cloud computing environment implemented by a third party and configured and accessed according to the Red Hat® OpenShift® and/or Kubernetes® protocols. Conditions within such computing environments may vary, which may change the configurations required for applications to execute properly and/or efficiently. It may therefore be unduly burdensome for users to configure applications properly and to update configurations in response to changes in the current conditions within the computing environments. Furthermore, applications that are incorrectly configured may utilize excessive computing resources within the computing environment and/or may not properly execute to fulfill expected functions. For example, an application may be configured to execute with too many instances for its workload, and the additional instances may unnecessarily utilize computing resources (e.g., processing cores and/or memory capacity) within the computing environment (e.g., on a cluster or clusters executing the application). As another example, an application may be migrated from one computing environment to a new computing environment (e.g., from a first set of clusters to a second set of clusters). The new computing environment may have different computing resources and may therefore necessitate a different configuration.

Therefore, it may be necessary to identify when an application executing within a computing environment has been incorrectly configured. One solution to this problem is to train a machine learning model to identify when the configuration of an application results in lower than expected execution metrics. For example, the machine learning model may be trained in a testing environment configured to test and validate various application configurations before deploying applications. Then, within a computing environment executing a deployed application, the machine learning model may analyze the configuration of the application and/or execution metrics of the application to identify a corresponding configuration. Based on the corresponding configuration, expected metrics may be identified and the expected metrics may be compared to the execution metrics of the application. The configuration of the application may then be updated if a difference is identified between the execution metrics and the expected metrics (e.g., a difference indicating that the execution metrics are worse than the expected metrics).

Figure 1A:
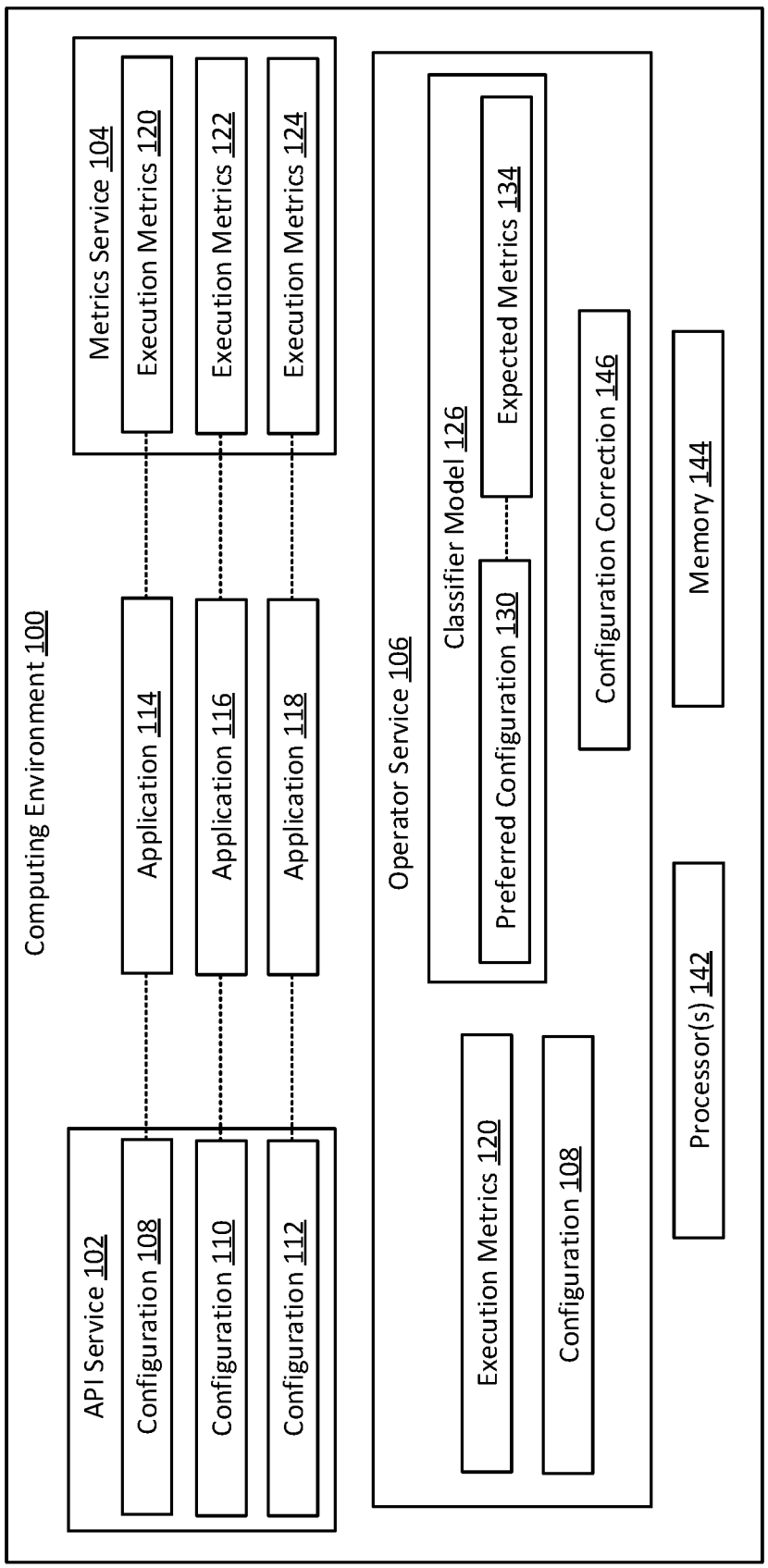
FIG. 1A illustrates a computing environment for correcting application configurations according to an exemplary embodiment of the present disclosure.

FIG. 1A illustrates a computing environment 100 for correcting application configurations according to an exemplary embodiment of the present disclosure. The computing environment 100 may be configured to execute applications 114, 116, 118. In particular, the computing environment 100 includes processor(s) 142 and memory 144, which may be utilized to execute the applications 114, 116, 118. For example, one or more cores of the processor(s) 142 and particular amounts of the memory 144 may be allocated to each of the applications 114, 116, 118 for execution. In certain implementations, the computing environment 100 is an exemplary implementation of all or part of a cloud computing environment (e.g., a cluster of a Kubernetes® cloud environment) or other distributed computing environment. For example, the computing environment 100 may be configured to execute applications on behalf of entities different from an entity implementing the computing environment 100. The applications 114, 116, 118 may execute to perform different functions. For example, the application 114 may be executing as a data grid providing access and/or storage of data to other users, including users external to the computing environment 100. As another example, the application 116 may be executing to provide data synchronization between multiple computing clients. As a further example, the application 118 may execute to provide a send/receive buffer (e.g., for sending/receiving data) for the applications 114, 116.

Each of the applications 114, 116, 118 may have an associated configuration 108, 110, 112 and/or execution metrics 120, 122, 124. The configurations 108, 110, 112 may be applied by an application programming interface (API) service 102. The API service 102 may be configured to interface with the applications 114, 116, 118 in order to ensure that the applications 114, 116, 118 execute according to the configurations 108, 110, 112. Specifics regarding application configurations are discussed in greater detail below in connection with FIG. 2.

The execution metrics 120, 122, 124 may specify information regarding performance of each of the applications 114, 116, 118. The execution metrics 120, 122, 124 may be collected by a metrics service 104 of the computing environment 100. For example, the metrics service 104 may be configured to interface with the applications 114, 116, 118 and/or portions of the computing environment 100 (e.g., networking interfaces/services, resource utilization monitors) to determine the operating conditions of the applications 114, 116, 118 and to store the operating conditions (e.g., operating conditions over time) as execution metrics 120, 122, 124. The execution metrics 120, 122, 124 may be collected on a regular basis, such as, e.g., every second, every 15 seconds, every minute, every five minutes, every 10 minutes. The execution metrics 120, 122, 124 may provide average performance measures over a period of time, such as a rolling period of time (e.g., the last 10 seconds, the last minute, the last 10 minutes) or for a period of time with a fixed starting point (e.g., since execution of the application 114, 116, 118 began). The execution metrics 120, 122, 124 may differ depending on the type of application 114, 116, 118. For example, for an application 114 executing to provide a data grid, the execution metrics 120 may specify a request throughput reflecting an average rate at which requests are received for the data grid, a request latency reflecting average response time to the received requests, and an average startup time for instances of the application 114. As another example, for an application 116 providing data synchronization, the execution metrics 122 may specify an amount of data transferred, times at which data is transferred, and data transfer latency indicating an average time it takes for data updated on one computing client to be updated on another computing client. As a further example, for applications 118 executing to provide a send/receive buffer, the execution metrics may include one or more of a request throughput, request latency, and average buffer utilization indicating an average amount of buffer space utilized during execution. Additionally or alternatively, the execution metrics 120, 122, 124 may indicate measures of resource utilization by the applications 114, 116, 118. For example, the execution metrics 120, 122, 124 may indicate an amount of processing power (e.g., number of processing cores, an overall processor utilization) utilized, an amount of memory utilized, an amount of bandwidth utilized, and an amount of storage space utilized. In light of the present disclosure, additional or alternative execution metrics to the discussed above may be apparent to those skilled in the art. All such execution metrics are presently contemplated and considered within the scope of the present disclosure.

The operator service 106 may be configured to analyze configurations of applications executing within the computing environment 100 and to generate corrections for the configurations. For example, as depicted, the operator service 106 may receive the execution metrics 120 and the configuration 108 of the application 114 and may generate a configuration correction 146 for the application 114. The operator service 106 includes a classifier model 126, which may be configured to identify a preferred configuration 130. The preferred configuration may be identified from among the configurations used to train the classifier model 126 (e.g., from among the configurations 156, 158, 160 used to test the application 114 in the testing environment 150. The preferred configuration 130 may be identified as a configuration that most closely resembles the configuration 108. For example, the preferred configuration 130 may be identified as a configuration with similar required resources and/or similar performance requirements as the configuration 108. The preferred configuration 130 may include corresponding expected metrics 134, which may specify one or more expected performance metrics for corresponding configurations. For example, the expected metrics 134 may specify a workload or other measure of expected performance capacity for the application 114 (e.g., a number of requests processed, an amount of data transferred). As another example, the expected metrics 134 may specify execution targets for the application 114 (e.g., a maximum latency, a minimum transfer speed). In certain implementations, the classifier model 126 may identify more than one preferred configuration 130 and corresponding expected metrics 134. In such instances, the expected metrics 134 may represent execution targets for different implementations (e.g., execution targets selected to optimize performance, execution targets selected to reduce resource utilization).

In certain implementations, the operator service 106 may include different classifier models 126 for one or more of the applications 114, 116, 118. For example, in certain implementations, the operator service 106 may have a separate classifier model 126 for each application 114, 116, 118. Additionally or alternatively, the computing environment 100 may have different operator services 106 with different classifier models 126 for different types of applications 114, 116, 118.

Based on the preferred configuration 130 identified by the classifier model 126, the operator service 106 may generate a configuration correction 146. For example, the configuration correction 146 may include one or more aspects of the preferred configuration 130 (e.g., implementation details from the preferred configuration 130). The configuration correction 146 may indicate an updated configuration for the application 114 (e.g., a complete configuration, a partial configuration). Additionally or alternatively, the configuration correction 146 may indicate particular changes that should be made to the configuration 108 of the application 114.

The computing environment 100 may be implemented by one or more computing devices, such as server computers, laptop computers, personal computers, virtual machines, smartphones, tablets, wearable computing devices, or any other suitable computing device. Additionally, the processor(s) 142 and memory 144 may be configured to implement one or more operational features of the computing environment 100. For example, memory 144 may store instructions which when executed by one or more of the processor(s) 142, may cause the processor(s) 142 to execute one or more operational features of the computing environment 100.

Figure 1B:
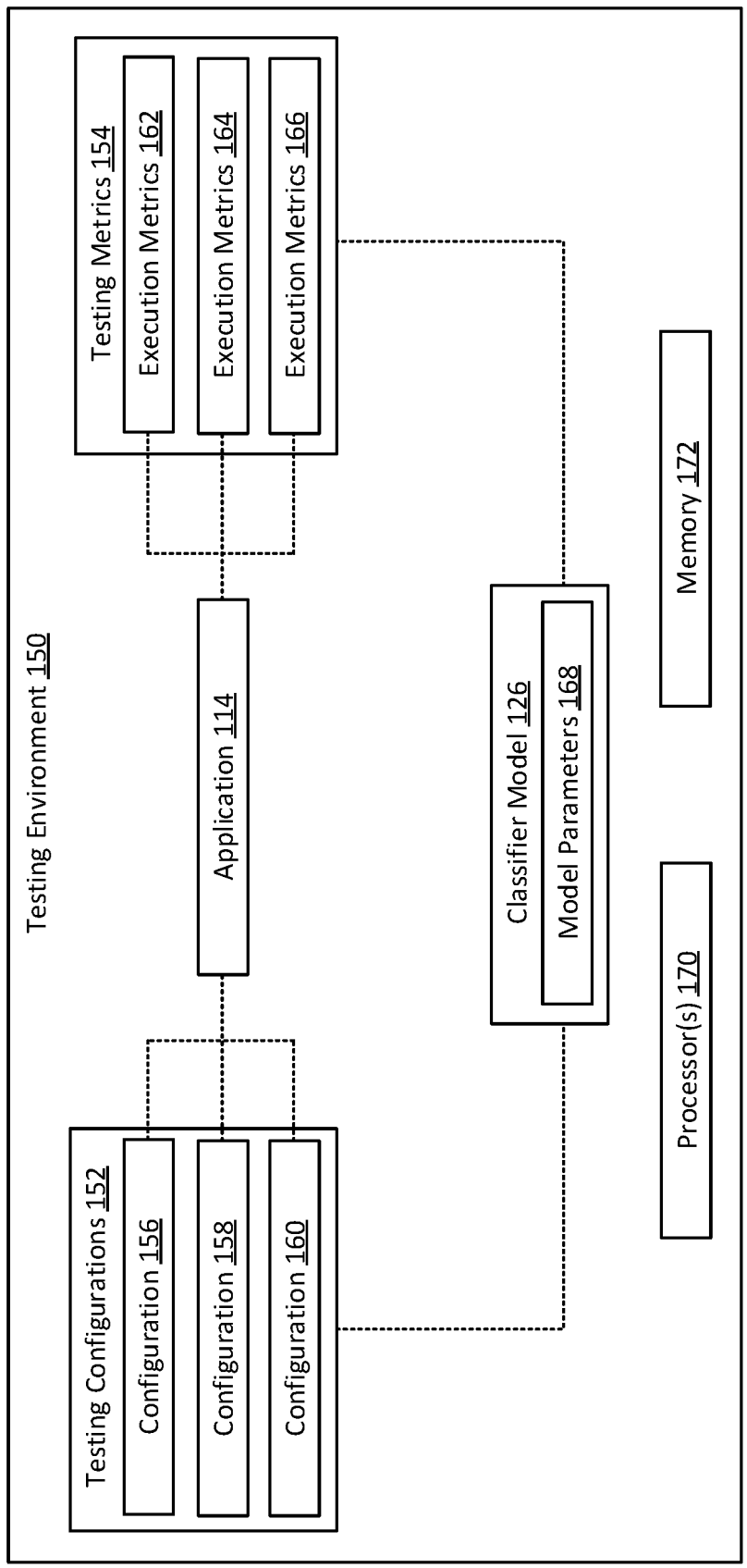
FIG. 1B illustrates a testing environment for application validation according to an exemplary embodiment of the present disclosure.

FIG. 1B illustrates a testing environment 150 for application validation according to an exemplary embodiment of the present disclosure. The testing environment 150 may be configured to test applications prior to deployment in computing environments 100 (e.g., cloud computing environments). For example, the testing environment 150 as depicted may be testing the application 114 prior to deployment in the computing environment 100. The testing environment 150 may test the application 114 according to testing configurations 152, which may be predefined. The testing configurations 152 include multiple configurations 156, 158, 160, which may specify particular configurations for the application 114. In particular, the configurations 156, 158, 160 may include information similar to the configurations 108, 110, 112 discussed above.

The testing environment 150 includes testing metrics 154. The testing metrics 154 include multiple execution metrics 162, 164, 166. The execution metrics 162, 164, 166 may include information regarding performance of the application 114. For example, the execution metrics 162, 164, 166 may include information regarding, e.g., response latency, computing resource utilization, and/or any of the performance measures discussed above in connection with the execution metrics 120, 122, 124. The execution metrics 162, 164, 166 may also include information regarding the operating conditions and/or workloads that the application 114 operates under during testing. For example, the execution metrics 162, 164, 166 may specify, e.g., a number of requests the application 114 receives during testing, an amount of data for transfer during a test, an amount of available bandwidth or other system resources.

The configurations 156, 158, 160 may include configurations 156, 158, 160 optimized for performance under heavy loads for the application 114 and configurations 156, 158, 160 optimized for minimal resource utilization during execution of the application 114. The application 114 may be tested multiple times based on the configurations 156, 158, 160 and the execution metrics 162, 164, 166. For example, each configuration 156, 158, 160 may be executed according to one or more of the execution metrics 162, 164, 166. For example, each of the execution metrics 162, 164, 166 may include one or more corresponding configurations 156, 158, 160 for testing. Alternatively, each of the configurations 156, 158, 160 may include one or more execution metrics 162, 164, 166 for which testing should be performed. To test the application 114, the testing environment 150 may execute the application 114 according to a particular configuration 156, 158, 160 and may record the resulting performance in the execution metrics 162, 164, 166.

The testing configurations 152 and testing metrics 154 may be used to train the classifier model 126 for subsequent use in the computing environment 100. For example, if the application 114 meets performance requirements according to the performed tests, the application 114 may be deployed (e.g., for production use) to computing environments such as the computing environment 100. When deploying the application 114, the testing environment 150 may also deploy the classifier model 126 for use in identifying preferred configurations 130. In certain implementations, the classifier model 126 may be implemented as a machine learning model configured to classify received execution metrics 120 and configurations 108 to identify the most similar combination of preferred configuration and expected metrics. In particular, the classifier model 126 may be implemented as one or more of a decision tree classifier, logistic regression classifier, nearest neighbor classifier, neural network classifier, support vector machine, and a naïve Bayes classifier. The classifier model 126 may be trained based on at least a subset of the testing configurations 152 and the testing metrics 154. For example, the testing configurations 152 and/or testing metrics 154 may include one or more training sets of configurations and execution metrics that may be used to train the classifier model 126. For example, the training sets may specify a corresponding preferred configuration 130 for particular received configurations. For example, the configuration 156 may represent an inefficient or erroneous configuration of the application 114 under particular operating conditions and the configuration 158 may represent a preferred configuration of the application 114 under the particular operating conditions. The training set may therefore include the configuration 156 and an identifier that, under the particular operating conditions, the configuration 158 should be identified as the preferred configuration 130 for the configuration 156. The classifier model 126 may analyze the training sets to predict the corresponding preferred configuration 130. Model parameters 168 of the classifier model 126 may be updated based on whether the classifier model 126 correctly classified the configurations within the training sets. In particular, the parameters may include weights (e.g., priorities) for different features and combinations of features (e.g., information included within the configurations and execution metrics) and updating the classifier model 126 may include updating one or more of the features analyzed and the weights assigned to different features and/or combinations of features. Furthermore, although discussed as a classifier model, in other implementations, the classifier model 126 may be implemented as other types of machine learning models (e.g., supervised learning models, unsupervised learning models). The classifier model 126 may be trained until a sufficient level of accuracy in identifying the third configurations for the training sets of configurations is reached (e.g., 75%, 90%, 95%). For example, the training process may be repeated for the same or different training sets of configurations until the sufficient level of accuracy is reached. The classifier model 126 may then be deployed to computing environments, such as the computing environment 100 (e.g., may be deployed in combination with the application 114).

The testing environment 150 may be implemented by one or more computing devices, such as server computers, laptop computers, personal computers, virtual machines, smartphones, tablets, wearable computing devices, or any other suitable computing device. Additionally, the processor(s) 170 and memory 172 may be configured to implement one or more operational features of the testing environment 150. For example, memory 172 may store instructions which when executed by one or more of the processor(s) 170, may cause the processor(s) 170 to execute one or more operational features of the testing environment 150.

Figure 2:
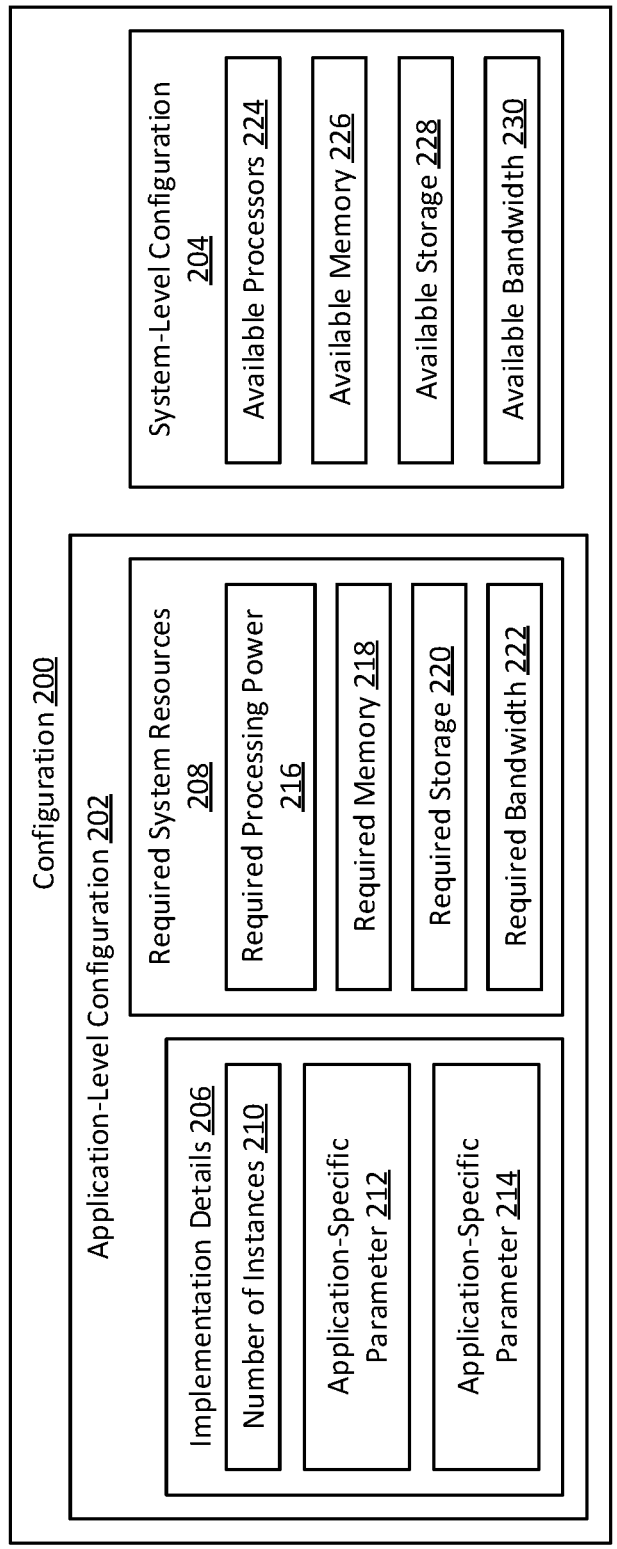
FIG. 2 illustrates a configuration according to an exemplary embodiment of the present disclosure.

FIG. 2 illustrates a configuration 200 according to an exemplary embodiment of the present disclosure. The configuration 200 may be an exemplary implementation of configurations used by the computing environment 100 and/or the training environment 150. For example, the configuration 200 may be an exemplary implementation of the configurations 108, 110, 112, 156, 158, 160 and/or the preferred configuration 130. The configuration 200 includes an application-level configuration 202 and a system-level configuration 204. In certain implementations, the configuration 200 may be implemented as a data structure storing the application-level configuration 202 and/or the system-level configuration 204. For example, the configuration 200 may be stored as one or more of an extended markup language (XML) file, a Kubernetes® ConfigMap data structure, a YAML file, and/or a JavaScript Object Notation (JSON) file.

The application-level configuration 202 may specify particular options and/or parameters specific to particular implementations of applications 114, 116, 118 (e.g., may specify how the application 114, 116, 118 executes within the computing environment 100). For example, the application-level configuration 202 may include implementation details 206 that specify particular implementation options and/or parameters for the applications 114, 116, 118. As a specific example, the implementation details 206 may include a number of instances 210 specifying a number of instances of the application 114, 116, 118 that should execute within the computing environment 100. For example, certain applications 114, 116, 118 may be capable of executing as one or more instances executing in parallel (e.g., instances executing within separate containers and/or virtual machines of the computing environment 100), and the number of instances 210 may specify one or more of a required number of instances, minimum number of instances, and/or maximum number of instances for the application 114, 116, 118. The implementation details 206 may also include one or more application-specific parameters 212, 214. The application specific parameters 212, 214 may specify one or more parameters or options that configure how the particular application 114, 116, 118 executes within the computing environment 100. The specific types of application-specific parameters 212, 214 may differ depending on the specific type of application. For example, for an application 114 executing to provide a data grid, the application-specific parameters 212, 214 may include one or more of a number of initial members expected when detecting members of the data grid, a request timeout period specifying the maximum number of time in instance of the application 114 will wait for a response when detecting members of the data grid, a member discovery protocol specifying the type of communication protocol members of the data grid utilized to communicate, a storage configuration specifying a type of formatting and/or a storage protocol used to store data within the data grid, a duplication protocol specifying whether and how data is duplicated across multiple members of the data grid, and/or a maximum size of files and/or partial files stored on the data grid. As another example, for an application 116 providing data synchronization, the application-specific parameters 212, 214 may specify one or more of an update frequency uploading and/or downloading synchronized data, a maximum data size for files or partial files synchronized between clients, a preferred data transfer speed, a data storage format, and/or a maximum number of clients per synchronization operation. As a still further example, for an application 118 executing to provide a send/receive buffer, the application-specific parameters 212, 214 may specify one or more of a number of buffers to be implemented by each instance of the application 118, a storage capacity for each buffer, a maximum or minimum payload size for the buffers, and/or an uptime for instances of the application 118.

Additionally or alternatively, the application-level configuration 202 may identify required system resources 208 indicating amounts of resources needed to execute the application 114, 16, 118 and/or to execute instances of the application 114, 116, 118 within the computing environment 100. For example, the required system resources 208 may specify a required processing power 216, (e.g., a minimum number of processing cores, maximum number of processing cores) and/or required memory 218 (e.g., a minimum memory capacity required, a maximum memory capacity required, a type of memory required). The required system resources 208 may additionally or alternatively include required storage 220 (e.g., a minimum amount of storage space required, a maximum amount of storage space required, a particular type of storage space required, a storage data transfer speed required) and/or a required bandwidth 222 (e.g., a minimum of network bandwidth required, a maximum amount of network bandwidth required, a particular network communication interface required). The required resources 208 may be specified for the application 114, 116, 118 overall and/or may specify the resources required for individual instances of the application 114, 116, 118.

The system-level configuration 204 may specify an amount of one or more system resources available for execution of applications 114, 116, 118. For example, the system-level configuration 204 may specify the amount of one or more system resources available within the computing environment 100 (e.g., available within the cluster in which the application 114, 116, 118 is executing). As a specific example, the system-level configuration 204 may specify one or more of available processors 224 (e.g., available processing cores), available memory 226 (e.g., available memory capacity and/or available memory speed), available storage 228 (e.g., available storage capacity and/or available storage transfer speed), and/or available bandwidth 230 (e.g., available bandwidth transfer capacity). In certain implementations, the system-level configuration 204 may specify a total amount of system resources available. Additionally or alternatively, the system-level configuration 204 may specify an amount of system resources that are available and are not allocated for use with other system functions (e.g., other applications). For example, one or more applications may reserve access to particular system resources (e.g., particular processing cores and/or particular capacities of memory), but may not be currently using the reserve computing resources to execute. In such instances, the system-level configuration 204 may omit such reserved computing resources from indications of the available system resources.

It should be understood that certain implementations of the configuration 200 may differ from those depicted in FIG. 2. For example, certain implementations of the configuration 200 may lack one or more of the implementation details 206, the required system resources, and the system level configuration 204. Additionally or alternatively, certain implementations of the required system resources 208, the implementation details 206, and/or the system-level configuration 204 may omit one or more of the depicted pieces of information and/or may include additional pieces of information. For example, the required system resources 208 and/or the system-level configuration 204 may include information regarding additional types of system resources to those depicted and/or may exclude information regarding one or more of the depicted types of system resources.

Figure 3:
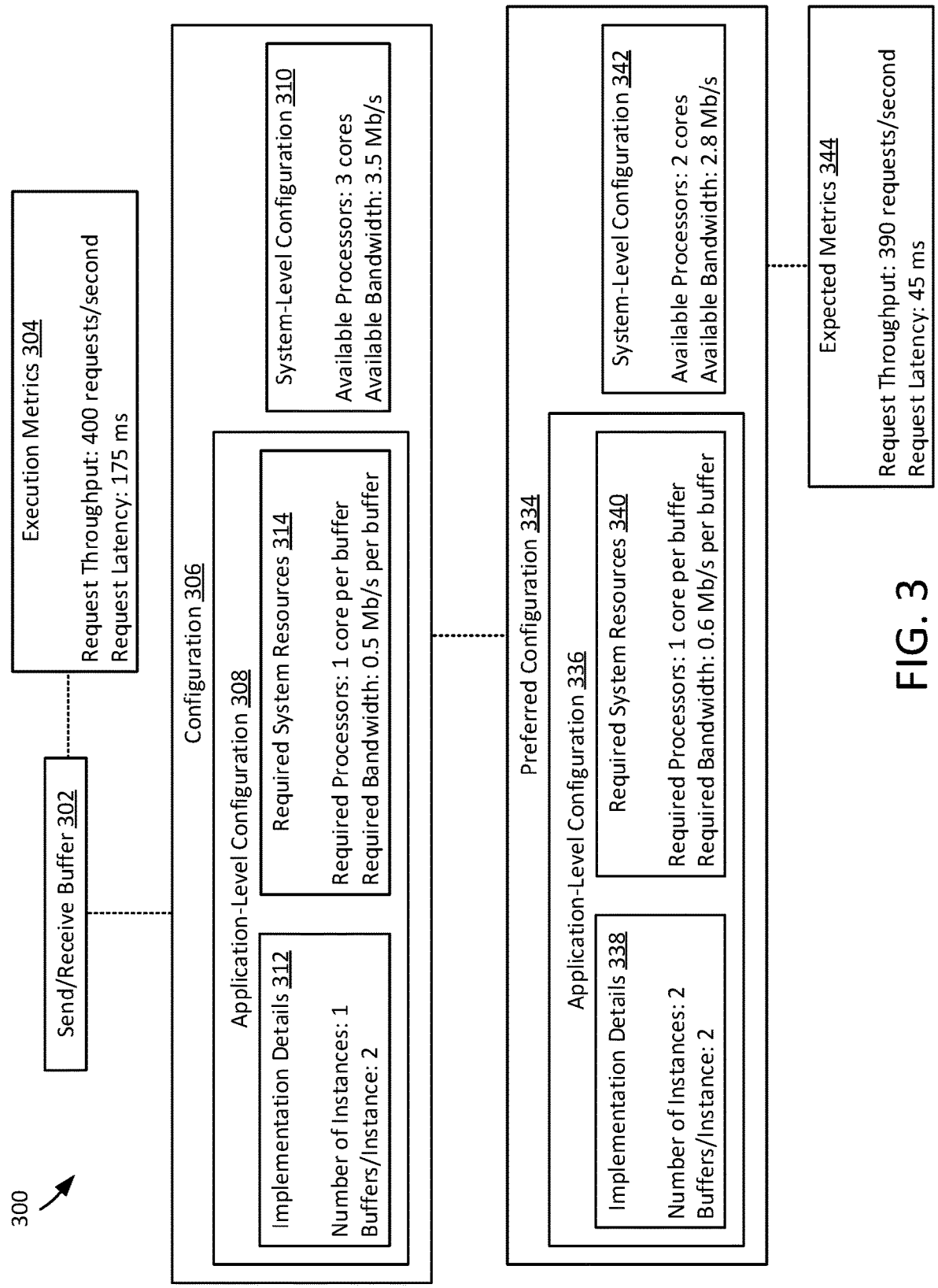
FIG. 3 illustrates an operation to correct an application configuration according to an exemplary embodiment of the present disclosure.

FIG. 3 illustrates an operation 300 to correct the configuration of an application according to an exemplary embodiment of the present disclosure. The operation 300 may be performed to identify a preferred configuration for an application and to update the configuration of the application based on the preferred configuration. In particular, the operation 300 may be performed to update the configuration 306 of a send/receive buffer 302. The send/receive buffer 302 may be an application executing within a computing environment 100. The send/receive buffer 302 may be communicatively coupled to an endpoint (e.g., an endpoint of another application, such as an application implementing an application programming interface (API) call). In particular, the send/receive buffer 302 may be configured to receive and store data payloads intended for the application (e.g., API requests) and to transmit data payloads on behalf of the application (e.g., API responses).

As depicted, the configuration 306 includes an application-level configuration 308 and a system-level configuration 310. The application-level configuration 308 includes implementation details 312 specifying that there is one instance of the send/receive buffer 302 executing and that the instance is implementing two buffers (e.g., is capable of transmitting/receiving two data payloads at the same time). For example, the number of instances and number of send/receive buffers per instance may be controlled to provide a desired number of send/receive buffers (e.g., sufficient send/receive buffers to receive and process requests with a maximum amount of latency). In particular, in certain instances (e.g., where available processing cores are fragmented among different processors 142) it may be advantageous to execute more instances of the send/receive buffer 302 spread across multiple processors 142. In further instances (e.g., where many processing cores are available on the same processor 142) it may be advantageous to execute more buffers per instance of the send/receive buffer 302 (e.g., in order to reduce container or VM-based computing overhead for multiple instances executing in multiple containers and/or VMs).

The application-level configuration 308 also includes required system resources 314 specifying that each buffer requires one processing core and 0.5 Mb/s of bandwidth in order to function properly. The system-level configuration 310 specifies that there are three available processing cores and 3.5 Mb/s of available bandwidth within the computing environment 100.

The send/receive buffer 302 also includes associated execution metrics 304 (e.g., execution metrics collected by the metrics service 104 during execution of the send/receive buffer 302 within the computing environment 100). The execution metrics 304 may specify operating conditions and performance of the send/receive buffer 302. For example, as depicted, the execution metrics 304 specify that the send/receive buffer 302 (e.g., all instances and buffers combined) receive 400 requests per second and have an average request latency of 175 ms. In general, it may be preferable to process requests with latencies of 50 ms or less. For example, other applications may transmit data to and receive data from the send/receive buffer, so longer request latencies can delay processing not only by the send/receive buffer 302, but also by the other applications.

Therefore, to resolve such issues, an operator service 106 may receive the configuration 306 and the execution metrics 304 in order to correct the configuration 306 and reduce the request latency. For example, a user implementing and/or executing the send/receive buffer 302 may provide the configuration 306 and the execution metrics 304 to an operator service 106 executing within the same computing environment 100 as the send/receive buffer 302. In certain implementations, the configuration 306 and the execution metrics 304 may be received by an operator service 106 associated with the send/receive buffer 302 (e.g., an operator service 106 configured to update the configurations of applications executing to implement send/receive buffers 302). The operator service 106 may analyze the configuration 306 and the execution metrics 304 with a classifier model 126 to identify a preferred configuration 130. For example, the operator service 106 may include a classifier model 126 configured to (e.g., trained to) identify preferred configurations 130 of send/receive buffers 302 originating from previous testing configurations of send/receive buffers (e.g., in the testing environment 150).

The corresponding preferred configuration may be similar to the configuration 306 and/or may have corresponding reference execution metrics similar to the execution metrics 304. The preferred configuration 334 may be identified as corresponding to configuration 306. For example, the classifier model 126 may identify the matched configuration 324 as corresponding to the configuration 306 by classifying the configuration 306 as most closely resembling the preferred configuration 334. In particular, the configuration 306 may be classified based on one or more characteristics of the implementation details 312, the required system resources 314, and the system-level configuration 310 and may additionally or alternatively be classified based on the execution metrics 304. As a specific example, the classifier model 126 may classify the configuration 306 based on the required system resources 314. In particular, the preferred configuration 334 includes required system resources 340 that are similar to the required system resources 314. For example, the required system resources 340 specify that one processing core and 0.6 Mb/s of bandwidth are required for each buffer that is implemented. As a further example, the classifier model 126 may classify the configuration 306 based on at least a portion of the execution metrics 304. For example, the expected metrics 344 indicate an expected request throughput of 390 requests per second, which is similar to the request throughput of 400 requests per second for the execution metrics 304. Therefore, the preferred configuration 334 may correspond to a send/receive buffer implementation with similar amounts of required computing resources and similar operational requirements. In still further examples, the classifier model 126 may ignore certain characteristics. For example, the implementation details 338 specify that two instances of the send/receive buffer 302 are executing and that each instances is implementing two buffers (e.g., utilizing a total of four processing cores). Similarly, the system-level configuration 342 specifies that two processing cores and 2.8 Mb/s of bandwidth are available, which differs from the three processing cores and 3.5 Mb/s of available bandwidth indicated by the system-level configuration 310. It should also be understood that the execution metrics 304, expected metrics 344, configuration 306, and preferred configuration 334 may, in certain implementations, include additional parameters and/or items of information. In such instances, the depicted parameters and/or items of information may differ from the characteristics utilized to classify the configuration 306.

The operator service 106 may then correct the configuration 306 based on the preferred configuration 334. For example, the operator service 106 may identify a configuration correction 146 that updates all or part of the configuration 306 based on corresponding portions of the corrected configuration 334. For example, the operator service 106 may update the implementation details 312 to be the same as the implementation details 338 (e.g., to implement two instances of the send/receive buffer 302, each instance including two buffers). In certain implementations, prior to identifying and/or implementing the configuration correction 146, the operator service 106 may compare the execution metrics 304 with the expected metrics 344. For example, the operator service may only implement a configuration correction 146 (e.g., may only update the configuration 306) if the execution metrics 304 differ from the expected metrics 344. For example, the configuration 306 may only be updated if one or more of the metrics (or a subset of the metrics) included in the execution metrics 304 differs from the corresponding metrics of the expected metrics. As a specific example, the execution metrics indicates a request latency of 175 ms, while the expected metrics 344 indicates a request latency of 45 ms. The operator service 106 may therefore, based on the difference, generate and apply the configuration correction 146. In certain implementations, the operator service 106 may only identify a difference if the execution metrics 304 differ by more than a predetermined amount or percentage from the expected metrics 344 (e.g., 5%, 10%, 25%). In still further implementations, the operator service 106 may only identify a difference if the execution metrics 304 indicate worse performance than the expected metrics 344 (e.g., a longer latency, more computing resources utilized, a lower percentage of correct responses).

In certain instances, the operation 300 may be performed as part of updating the configuration of another application. For example, the send/receive buffer 302 may receive and transmit data payloads on behalf of another application and the configuration 306 of the send/receive buffer 302 may be updated as a part of updating the configuration of the other application. As a specific example, the send/receive buffer 302 may receive and transmit data payloads on behalf of a data grid member and the configuration 306 may be updated in connection with updating the configuration of the data grid member.

It should be understood that the operation 300 as depicted merely represent one embodiment of an operation to update the configuration of the send/receive buffer 302. For example, additional or alternative implementations may include configurations having more, fewer, and/or different parameters and/or items of information. As another example, comparisons (e.g., comparisons performed by the classifier model 126) may consider additional or alternative characteristics of the configuration 306 and execution metrics 304.

Figure 4:
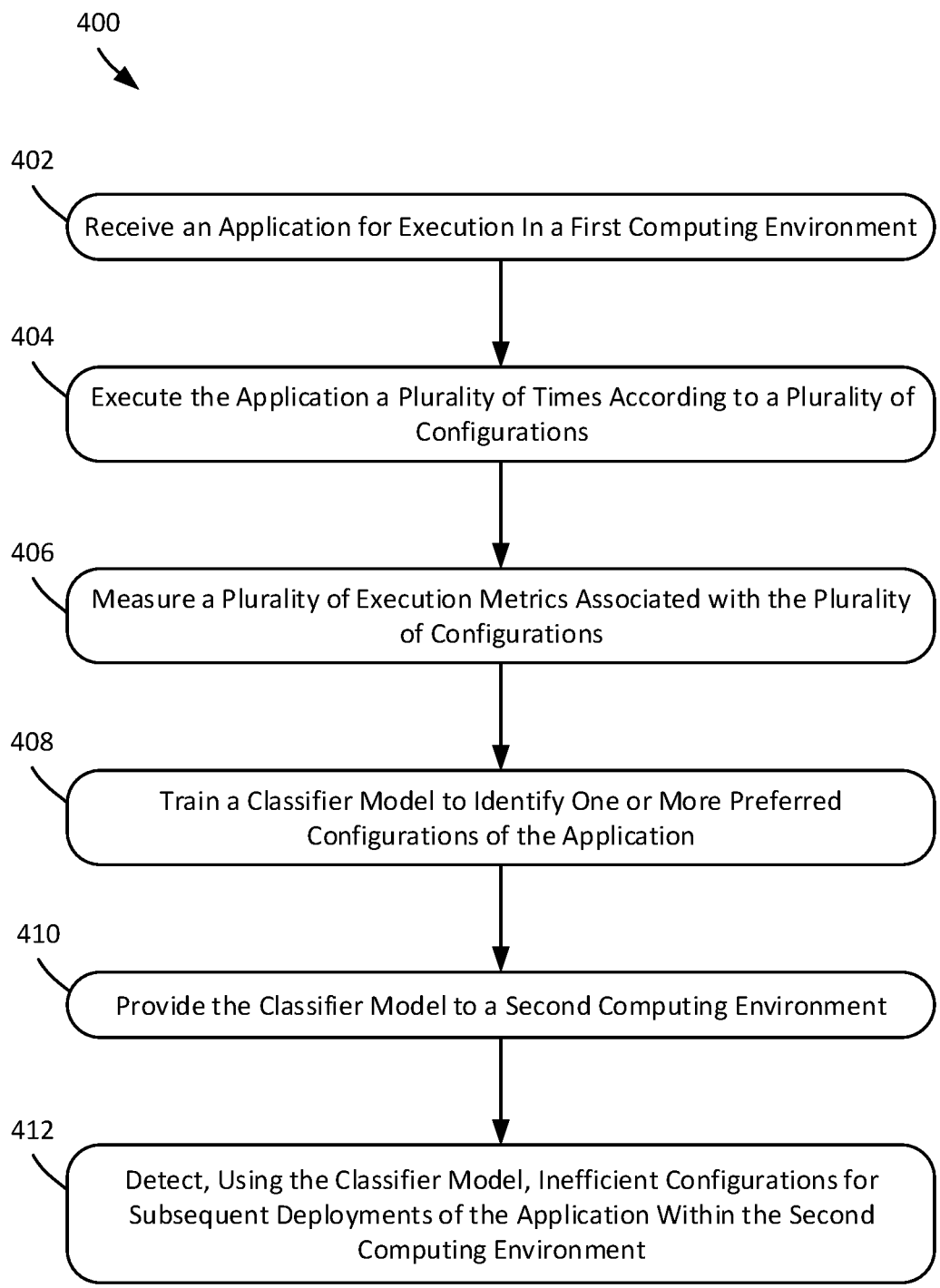
FIG. 4 illustrates a method for training and deploying a classifier model according to an exemplary embodiment of the present disclosure.

FIG. 4 illustrates a method 400 for training and deploying a classifier model according to an exemplary embodiment of the present disclosure. The method 400 may be implemented on a computer system, such as the computing environment 100 and/or the testing environment 150. The method 400 may also be implemented by a set of instructions stored on a computer-readable medium that, when executed by a processor, cause the processor to perform the method 400. For example, all or part of the method 400 may be implemented by the processor(s) 142, 170 and the memories 144, 172. Although the examples below are described with reference to the flowchart illustrated in FIG. 4, many other method of performing the acts associated with FIG. 4 may be used. For example, the order of some of the blocks may be changed, certain blocks may be combined with other blocks, one or more of the blocks may be repeated, and some of the blocks described may be optional.

The method 400 may begin with receiving application for execution in a first computing environment (block 402). For example, the testing environment 150 may receive an application 114 for execution (e.g., for execution of a send/receive buffer and/or a data grid). In particular, the testing environment 150 may receive the application 114 for testing and validation prior to deployment in a second computing environment, such as the computing environment 100.

The application may be executed a plurality of times according to a plurality of configurations (block 404). For example, the testing environment 150 may execute the application 114 multiple times according to multiple configurations 156, 158, 160. As described above, the application 114 may be executed often times for different combinations of configurations 156, 158, 160 and execution metrics 162, 164, 166 specifying operating conditions for the application 114 (e.g., different predetermined tests specifying particular combinations). As a specific example, the application 114 may execute to provide a send/receive buffer 302. The configurations 156, 158, 160 may specify, e.g., different numbers of instances, different buffers. Instance, different amounts of processors and/or bandwidth per buffer. Similarly, the execution metrics 162, 164, 166 may specify different amounts of requests received per second and/or different amounts of data transmitted with each transmitted response.

A plurality of execution metrics may be measured associated with the plurality of configurations (block 406). For example, the testing environment 150 may measure a plurality of execution metrics 162, 164, 166 associated with the different configurations 156, 158, 160. Continuing the previous example, where the application 114 executes to provide a data buffer, the testing environment 150 may execute the application 114 according to the configurations 156, 158, 160 (e.g., with different numbers of instances and/or buffers) and may measure the resulting request latency. As discussed above, the execution metrics 162, 164, 166 may specify operating conditions for the application 114, and different configurations 156, 158, 160 may be executed for each of the specified operating conditions (e.g., according to one or more predetermined tests). The resulting execution metrics (e.g., performance metrics) may be stored with identification of the corresponding configuration for each configuration 156, 158, 160 executed according to the execution metrics 162, 164, 166.

A classifier model may be trained to identify one or more preferred configurations of the application (block 408). For example, the testing environment 150 may train the classifier model to identify one or more preferred configurations 130 of the application 114. To train the classifier model 126, one or more parameters 168 of the classifier model 126 may be updated. For example, the model parameters 168 may identify which features of received configurations and execution metrics are used to identify corresponding preferred configurations 130. Updating the model parameters 168 as a result of the training may add or remove characteristics of configurations and execution metrics considered when identifying preferred configurations 130. Additionally or alternatively, updating the model parameters may change (e.g., increase or decrease) weights associated with particular characteristics.

The classifier model may be provided to a second computing environment (block 410). For example, the classifier model 126 may be provided to a second computing environment 100 used to execute applications 114, 116, 118 in a production setting. In particular, the classifier model 126 may be received from the testing environment 150 along with the application 114, e.g., after the application 114 passes the performed tests and/or after the classifier model 126 is trained to a sufficient level of accuracy. In certain implementations, the testing environment 150 may be part of the same computing infrastructure (e.g., a cloud computing infrastructure) is the computing environment 100. The testing environment 150 may accordingly transmit the classifier model 126 and/or the application 114 to the computing environment 100 via a network connection (e.g., an Internet network connection, a local network connection within the cloud computing infrastructure). Additionally or alternatively, the testing environment 150 may be implemented as part of the computing environment 100. In such instances, the testing environment 150 may provide the classifier model 126 and/or the application 114 to the computing environment 100 by making the classifier model 126 and/or the application 114 accessible to the computing environment 100 (e.g., a runtime environment and/or an operator service of the computing environment 100).

Inefficient configurations for subsequent deployments of the application within the second computing environment may be detected using the classifier model (block 412). For example, the classifier model 126 may detect inefficient configurations for subsequent deployments (e.g., instances) of the application 114 within the computing environment 100. In particular, the computing environment 100 may execute the application 114 according to a particular, specified configuration 108 (e.g., a configuration 108 received from an entity in whose behalf the application 114 is executed). While executing the application 114, a metrics service 104 may collect execution metrics 120 regarding the execution of the application 114. The classifier model 126 may receive the configuration 108 in the execution metrics 120 in order to analyze the configuration 108 in the execution metrics 120 to determine whether the configuration 108 is inefficient and/or undesirable (e.g., utilizes excessive computing resources, fails to meet one more performance requirements). To detect inefficient configurations of the application 114, the classifier model 126 may identify preferred configurations 130 and/or expected metrics 134 and may compare the expected metrics 134 to the execution metrics 120. In particular, the classifier model 126 may identify inefficient configurations without transferring information from the second computing environment, which may improve privacy confidentiality protections, as explained further below.

Performing the method 400 may enable the testing environment 150 to train and configure the classifier model 126 to identify inefficient configurations of applications executing within other computing environments 100. In particular, the classifier model 126 may be classify configurations as inefficient that differ from preferred configurations 130. Further, by detecting such inefficient configurations, the method 400 may enable improved performance for applications that are executing within the computing environments 100 (e.g., may improve responsiveness, execution speed, and/or may reduce overall resource utilization, freeing up additional resources for use in executing other applications). Further, the method 400 enables the classifier model 126 to be trained using existing testing systems and examples. By utilizing existing testing examples, the classifier model 126 can be trained without requiring the creation of specialized training datasets. Further, by utilizing existing testing systems, the classifier model 126 may be trained as part of testing and deploying the application 114, which may reduce the amount of time required to train the classifier model, resulting in faster deployment of both the application 114 and the classifier model 126.

Figure 5:
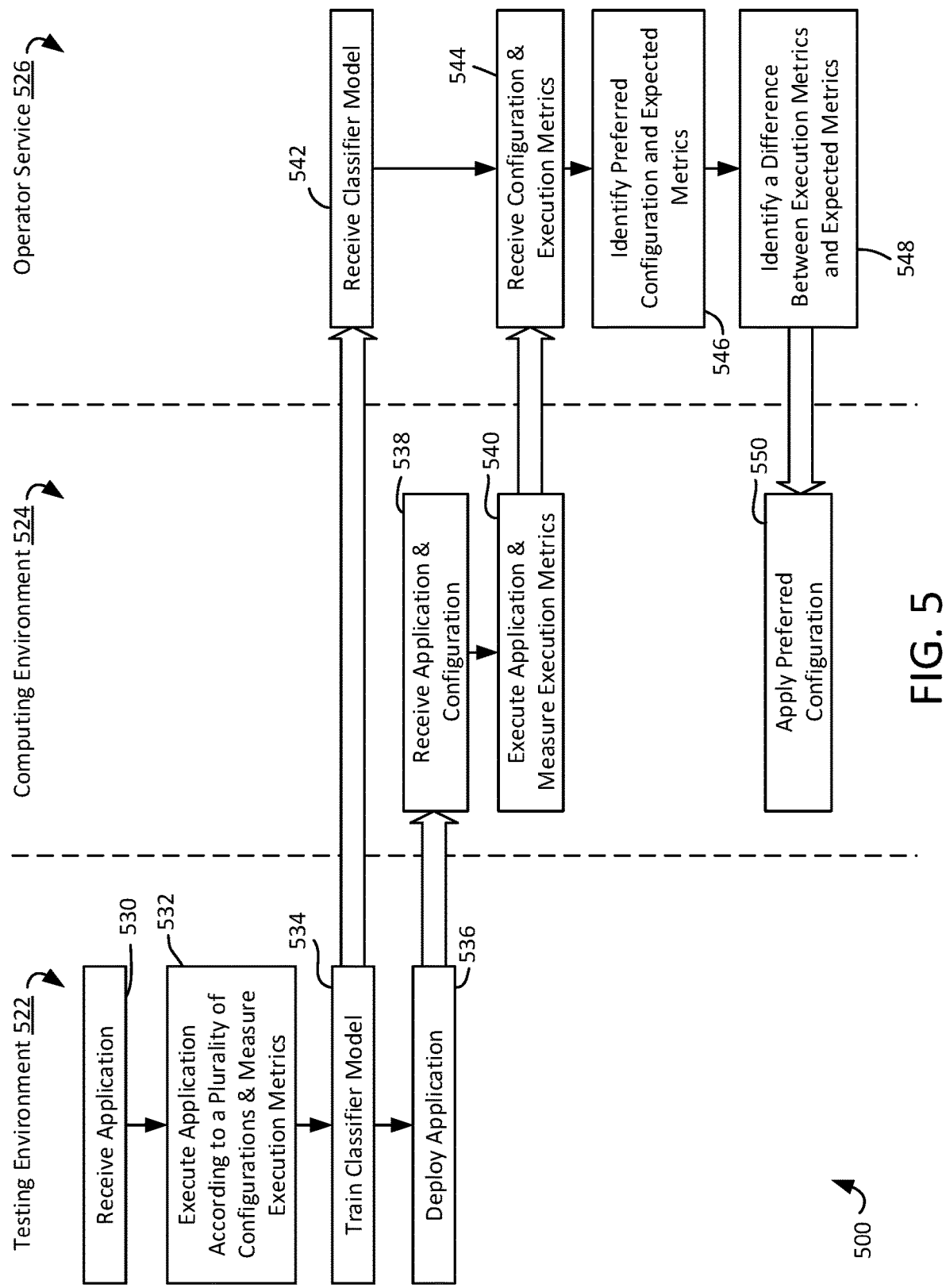
FIG. 5 illustrates a method for validating, deploying, and correcting the configuration of applications according to an exemplary embodiment of the present disclosure.

FIG. 5 illustrates a method 500 for validating, deploying, and correcting the configuration of applications according to an exemplary embodiment of the present disclosure. The method 500 may be implemented on a computer system, such as the computing environment 100 and/or the testing environment 150. In particular, the method 500 includes a testing environment 522, which may be an exemplary implementation of the testing environment 150, a computing environment 524, which may be an exemplary implementation of the computing environment 100, and an operator service 526, which may be an exemplary implementation of the operator service 106. The method 500 may also be implemented by a set of instructions stored on a computer-readable medium that, when executed by a processor, cause the processor to perform the method 500. For example, all or part of the method 500 may be implemented by the processor(s) 142, 170 and the memories 144, 172. Although the examples below are described with reference to the flowchart illustrated in FIG. 5, many other method of performing the acts associated with FIG. 5 may be used. For example, the order of some of the blocks may be changed, certain blocks may be combined with other blocks, one or more of the blocks may be repeated, and some of the blocks described may be optional.

The method 500 may begin with receiving an application (block 530). For example the testing environment 522 may receive an application 114 for testing and validation prior to deployment. The application may be executed a number of times according to a plurality of configurations and execution metrics may be measured (block 532). For example, the testing environment 522 may execute the application 114 multiple times according to multiple configurations 156, 158, 160 and may measure execution metrics 162, 164, 166 based on the executions of the application 114, as described above. The classifier model may be trained (block 534) and the application may be deployed (block 536). For example, the classifier model 126 may be trained to identify preferred configurations for implementations of the application 114 and the application 114 may be deployed by providing the application to the computing environment 524, as described above.

The application may be received along with a configuration for the application (block 538). For example, the computing environment 524 may receive the application 114 for the testing environment 150 may receive a configuration 108 for the application 114 (e.g., at an API service 102) along with a request to execute the application (e.g., a request received from a user and/or another computing process). The application may be executed and execution metrics may be measured (block 540). For example, the computing environment 524 may execute the application 114 according to the received configuration 108 and may measure execution metrics 120 concerning the operation of the application 114 according to the configuration 108. For example, the execution metrics 120 may measure operating conditions for the application 114 (e.g., information concerning a work load of the application 114) and/or may measure performance metrics of the application 114 (e.g., information concerning performance of the application 114 under the workload).

The classifier model may then be received (block 542). For example, the operator service 526 may receive the classifier model 126 from the testing environment 522 after training of the classifier model 126 is complete. The configuration and execution metrics may also be received (block 544). For example, after executing the application at block 540, the computing environment 524 may transmit the configuration 108 and execution metrics 122 the operator service 526. In certain implementations, the operator service 526 may be configured to have no further connectivity with the testing environment 522. For example, the operator service 526 may be configured to only receive the classifier model 126 from the testing environment and to receive no further updates or information. Such implementations may improve security, e.g., by preventing alterations to the classifier model 126 and/or by prevent the execution metrics and other information analyzed by the classifier model 126 from being accessed by other processes or environments.

A preferred configuration and expected metrics may be identified (block 546). For example, the operator 526 may identify a preferred configuration 130 and expected metrics 134 corresponding to the configuration 108 and/or the execution metrics 120. The preferred configuration and/or expected metrics 134 may be identified by a machine learning model, such as the classifier model 126. For example, the classifier model 126 may be trained to classify the configuration 108 and the execution metrics 120 into on one or more categories defined by one or more of the testing configurations 152 (e.g., defined during training of the classifier model 126 based on the testing configurations 152) and to identify the category including most similar combination of configuration and expected metrics. In particular, the classifier model 126 may identify the preferred configuration 130 which, in combination with corresponding reference execution metrics 134, most closely resembles the execution metrics 120 and the configuration 108. In an example where the application 114 is executing to provide responses to API calls, the configuration 108 may specify system requirements for instances of the application 114 executing within the computing environment 100 and the execution metrics 120 may specify, e.g., a number of requests received by the application 114. The preferred configuration 130 identified by the classifier model 126 may include similar system requirements for instances of the application 114 and the associated expected metrics 134 may include similar numbers of requests.

A difference may be identified between the execution metrics and the expected metrics (block 548). For example, the operator service 526 may identify a difference between the execution metrics 120 and the expected metrics 134. As claimed above, the difference may be identified by comparing particular portions of the execution metrics 120 and the expected metrics 134, such as portions indicating application performance (e.g., response latencies and/or resource utilization). In certain implementations, to identify a difference, the operator service 526 may have to determine that the difference between corresponding metrics of the execution metrics 120 and the expected metrics 134 exceed a certain predetermined threshold (e.g., a percentage-based threshold or an absolute threshold).

The preferred configuration may then be applied (block 550). For example, the computing environment 524 may apply the preferred configuration 132 all or part of the configuration 108 of the application 114. In applying the preferred configuration 130, the computing environment 524 may generate a configuration correction 146 that changes all or part of the configuration 108. In certain implementations, the configuration correction 146 may be generated based on a portion of the preferred configuration 130 (e.g., a difference between a portion of the preferred configuration 130 and a corresponding portion of the configuration 108). As a specific example, the configuration correction may be generated by identifying differences between the implementation details of the preferred configuration 130 and the configuration 108 and generating the configuration correction 146 to remove and/or reduce the differences. For example, the configuration 108 may indicate that a single instance of the application 114 is executing to service API requests and that the single instance of the application 114 is allocated 1 Mb/s of bandwidth. The execution metrics 120 may indicate that the application 114 is servicing 100 requests per second and has a response latency of 75 ms. The preferred configuration 130 may indicate that the application has three instances that are executing and that each instance has 0.7 Mb/s of bandwidth allocated (for a total of 2.1 Mb/s of bandwidth for the application). In certain implementations, the preferred configuration 130 may also include associated expected metrics 134 indicating improved performance (e.g., 90 requests per second received at a response latency of 10 ms). Based on the preferred configuration 130 the configuration correction 146 may be identified to include increasing the number of instances of the application 114. Additionally or alternatively, the computing environment 524 may update all or part of the configuration 108 (e.g., implementation details) to be the same as the corresponding portions of the preferred configuration 130.

By performing the method 500, the computing environment 100 may be able to improve the performance of applications that are executing with inefficient or erroneous configurations. In particular, where applications are executing below an expected performance threshold, the configurations of the applications may be analyzed by the operator service 526 according to the method 500 in order to restore proper performance of the applications. Additionally, the classifications and corrections made by the operator service 106 may be customized for different deployments. For example, in certain implementations, separate classifier models may be trained for different deployment contexts (e.g., based on tests performed prior to deploying applications). Further, the operator service 526 and the classifier model 126 may be capable of executing entirely within the computing environment 524 and without transferring data (e.g., data regarding the configuration 108, the application 114, and/or the execution metrics 120) outside of the computing environment 524 (e.g., a cluster executing the application 114). Such contained analysis may protect the confidentiality of sensitive applications and/or information and may assist in complying with privacy regulations, such as the European General Data Protection Regulation (GDPR).

Figure 6:
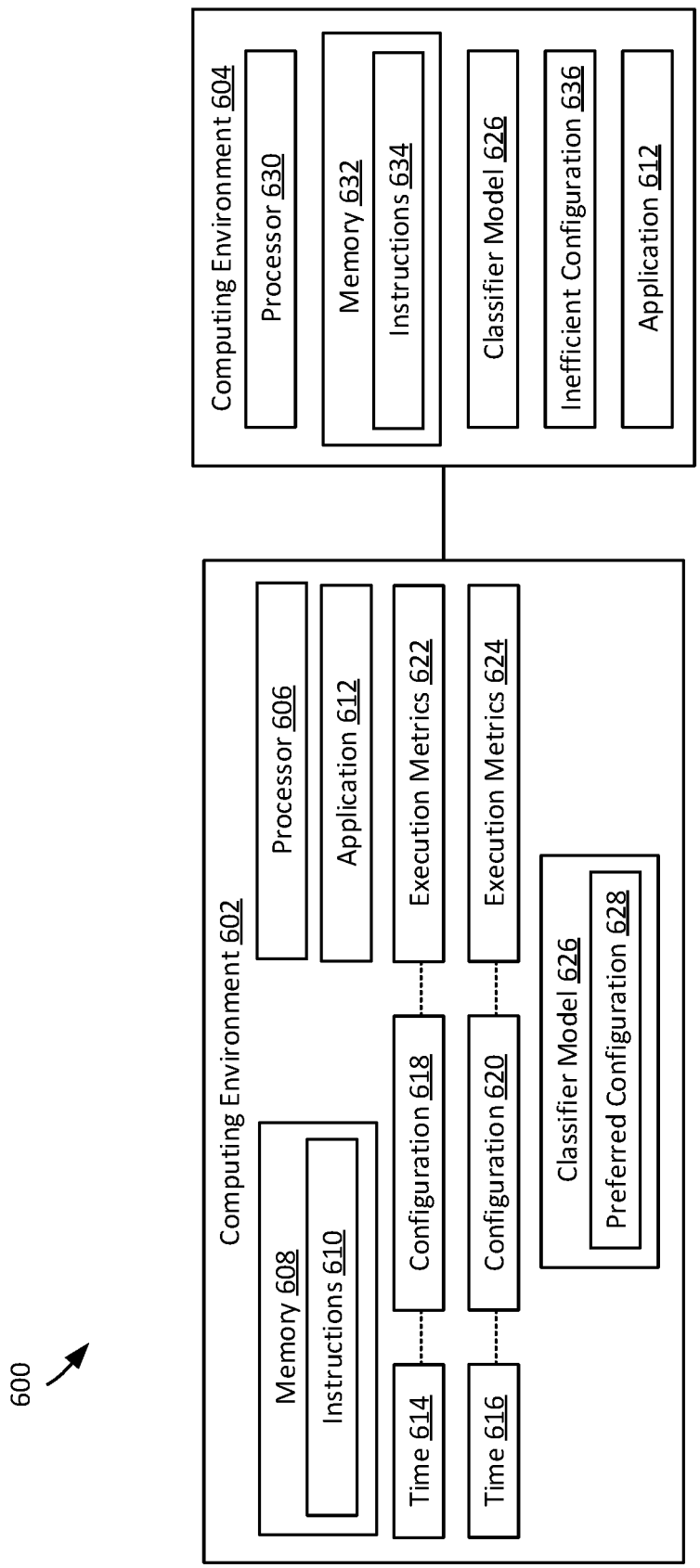
FIG. 6 illustrates a system according to an exemplary embodiment of the present disclosure.

FIG. 6 illustrates a system 600 according to an exemplary embodiment of the present disclosure. The system 600 includes a first computing environment 602 and a second computing environment 604. The first computing environment 602 includes a first processor 606 and a first memory 608. The first memory 608 stores instructions 610 which, when executed by the first processor 606, cause the first processor 606 to receive an application 612 for execution in a first computing environment 602 and execute the application 612 a plurality of times 614, 616 according to a plurality of configurations 618, 620, respectively. The instructions 610 may further cause the first processor 606 to measure a plurality of execution metrics 622, 624 associated with the plurality of configurations 618, 620. A classifier model 626 may be trained, based on the plurality of execution metrics 622, 624 and the plurality of configurations 618, 620, to identify one or more preferred configurations 628 for the application 612. The classifier model 626 may then be provided to the second computing environment 604. The second computing environment 604 may include a second processor 630 and a second memory 632. The second memory 632 may store instructions 634 which, when executed by the second processor 630, cause the second processor 630 to detect, using the classifier model 626, inefficient configurations 636 for subsequent deployments of the application 612 within the second computing environment 604 without transmitting configurations 636 or the application 612 from the second computing environment 604.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
   receiving an application for execution in a first computing environment;
   executing the application a plurality of times according to a plurality of configurations;
   measuring a plurality of execution metrics associated with the plurality of configurations;
   training, based on the plurality of execution metrics and the plurality of configurations, a classifier model to identify one or more preferred configurations for the application;
   providing the classifier model to a second computing environment; and
   detecting, using the classifier model, inefficient configurations for subsequent deployments of the application within the second computing environment.

2. The method of claim 1, wherein the first computing environment is a testing environment configured to validate applications prior to deployment.

3. The method of claim 2, wherein executing the application the plurality of times includes executing a plurality of predetermined tests prior to deployment of the application, and wherein measuring the plurality of execution metrics includes measuring the execution metrics during the predetermined tests.

4. The method of claim 2, wherein the testing environment is associated with a first entity, and wherein the second computing environment is configured to execute applications on behalf of a second entity.

5. The method of claim 1, wherein detecting inefficient configurations for subsequent deployments of the application further comprises:
   receiving (i) a configuration for the application within the second computing environment and (ii) execution metrics of the application within the second computing environment;
   identifying, with the classifier model, a corresponding preferred configuration and expected metrics associated with the corresponding preferred configuration;
   identifying a difference between at least one of the execution metrics and at least one of the expected metrics; and
   applying the corresponding preferred configuration to the application within the second computing environment.

6. The method of claim 5, wherein the configuration and at least a subset of the plurality of configurations include an application-level configuration specifying at least one of (i) application-specific implementation details and (ii) system resources required for execution.

7. The method of claim 6, wherein the configuration and the subset of the plurality of configurations further include a system-level configuration specifying an amount of one or more system resources available for execution of the function.

8. The method of claim 7, wherein identifying the preferred configuration includes comparing both the application-level configuration and the system-level configuration to the subset of the plurality of configurations.

9. The method of claim 5, wherein the configuration is received from an application programming interface service of the second computing environment, the application programming interface being configured to generate and apply configurations to applications executing within the second computing environment.

10. The method of claim 1, wherein the plurality of configurations include configurations optimized for performance under heavy loads and configurations optimized for minimal resource utilization during execution of the application.

11. The method of claim 1, wherein the execution metrics include at least one of a latency of the application, a throughput of the application, a processor utilization of the application, a memory utilization of the application, and a storage utilization of the application.

12. A system comprising a first computing environment and a second computing environment, the first computing environment comprising:
   a first processor; and
   a first memory storing instructions which, when executed by the first processor, cause the first processor to:
      receive an application for execution in the first computing environment;
      execute the application a plurality of times according to a plurality of configurations;
      measure a plurality of execution metrics associated with the plurality of configurations;
      train, based on the plurality of execution metrics and the plurality of configurations, a classifier model to identify one or more preferred configurations for the application; and
      provide the classifier model to the second computing environment, the second computing environment comprising:
         a second processor; and
         a second memory storing instructions which, when executed by the second processor, cause the second processor to:
            detect, using the classifier model, inefficient configurations for subsequent deployments of the application within the second computing environment.

13. The system of claim 12, wherein the first computing environment is a testing environment configured to validate applications prior to deployment.

14. The system of claim 13, wherein executing the application the plurality of times includes executing a plurality of predetermined tests prior to deployment of the application, and wherein measuring the plurality of execution metrics includes measuring the execution metrics during the predetermined tests.

15. The system of claim 13, wherein the testing environment is associated with a first entity, and wherein the second computing environment is configured to execute applications on behalf of a second entity.

16. The system of claim 12, wherein the second memory stores further instructions which, when executed by the second processor while detecting inefficient configurations for subsequent deployments of the application, cause the second processor to:
- receive (i) a configuration for the application within the second computing environment and (ii) execution metrics of the application within the second computing environment;
- identify, with the classifier model, a corresponding preferred configuration and expected metrics associated with the corresponding preferred configuration;
- identify a difference between at least one of the execution metrics and at least one of the expected metrics; and
- apply the corresponding preferred configuration to the application within the second computing environment.

17. The system of claim 16, wherein the configuration and at least a subset of the plurality of configurations include an application-level configuration specifying at least one of (i) application-specific implementation details and (ii) system resources required for execution.

18. The system of claim 17, wherein the configuration and the subset of the plurality of configurations further include a system-level configuration specifying an amount of one or more system resources available for execution of the function.

19. The system of claim 18, wherein identifying the preferred configuration includes comparing both the application-level configuration and the system-level configuration to the subset of the plurality of configurations.

20. A non-transitory, computer-readable medium storing instructions which, when executed by at least one processor, cause the at least one processor to:
- receive an application for execution in a first computing environment;
- execute the application a plurality of times according to a plurality of configurations;
- measure a plurality of execution metrics associated with the plurality of configurations;
- train, based on the plurality of execution metrics and the plurality of configurations, a classifier model to identify one or more preferred configurations for the application;
- provide the classifier model to a second computing environment; and
- detect, using the classifier model, inefficient configurations for subsequent deployments of the application within the second computing environment.

* * * * *